(12) United States Patent
Kravitz et al.

(10) Patent No.: US 12,092,503 B2
(45) Date of Patent: Sep. 17, 2024

(54) NOTIFICATION OF EVENTS AND APPORTIONING OF PROCESS DATA IN A METER

(71) Applicant: MICRO MOTION, INC., Boulder, CO (US)

(72) Inventors: Andrew S. Kravitz, Frederick, CO (US); Matthew A. Heller, Golden, CO (US); Nathan C. Murra, Boulder, CO (US); Tonya L. Wyatt, Arvada, CO (US)

(73) Assignee: MICRO MOTION, INC., Boulder, CO (US)

( * ) Notice: Subject to any disclaimer, the term of this patent is extended or adjusted under 35 U.S.C. 154(b) by 342 days.

(21) Appl. No.: 17/641,976

(22) PCT Filed: Sep. 25, 2019

(86) PCT No.: PCT/US2019/052851
§ 371 (c)(1),
(2) Date: Mar. 10, 2022

(87) PCT Pub. No.: WO2021/061111
PCT Pub. Date: Apr. 1, 2021

(65) Prior Publication Data
US 2022/0307883 A1    Sep. 29, 2022

(51) Int. Cl.
*G01F 1/84*    (2006.01)

(52) U.S. Cl.
CPC .......... *G01F 1/8436* (2013.01); *G01F 1/8477* (2013.01)

(58) Field of Classification Search
None
See application file for complete search history.

(56) References Cited

U.S. PATENT DOCUMENTS

| | | | |
|---|---|---|---|
| 7,040,179 B2* | 5/2006 | Drahm | G01F 1/849 73/861.356 |
| 7,296,232 B1 | 11/2007 | Burdick et al. | |
| 8,489,360 B2 | 7/2013 | Lundeberg et al. | |

(Continued)

FOREIGN PATENT DOCUMENTS

| | | |
|---|---|---|
| JP | 2012181715 A | 9/2012 |
| JP | 2018066748 A | 4/2018 |

(Continued)

OTHER PUBLICATIONS

Micro Motion Model 5700 Transmitters with MVD Technology Product Data Sheet, PS-001885, Rev G, Nov. 2017, pp. 1-32, www.micromotion.com.

*Primary Examiner* — Peter J Macchiarolo
*Assistant Examiner* — Jermaine L Jenkins
(74) *Attorney, Agent, or Firm* — The Ollila Law Group LLC (57) ABSTRACT

A meter electronics (20) configured to notify of an event and apportion process data is provided. The meter electronics (20) comprises a memory (230) configured to continuously store the process data (410) for a duration (412), a processor (210) communicatively coupled to the memory (230). The processor (210) is configured to detect one or more events (430) in the process data (410) and at least one of generate a notification (460) and apportion the process data (410) based on the detected one or more events (430).

24 Claims, 5 Drawing Sheets

(56) References Cited

U.S. PATENT DOCUMENTS

| | | | |
|---|---|---|---|
| 9,043,166 B2* | 5/2015 | Weinstein | G01N 11/16 |
| | | | 702/48 |
| 9,785,495 B1 | 10/2017 | Lazier et al. | |
| 10,591,334 B2* | 3/2020 | Gao | G01F 25/13 |
| 10,900,348 B2* | 1/2021 | Schollenberger | G01F 1/8477 |
| 10,935,402 B2* | 3/2021 | Foss | G01M 3/26 |
| 11,796,365 B2* | 10/2023 | Drost | G01F 15/12 |
| 2010/0100899 A1 | 4/2010 | Bradbury et al. | |
| 2012/0030194 A1 | 2/2012 | Jain | |
| 2013/0211745 A1 | 8/2013 | Jaeger | |
| 2014/0330439 A1* | 11/2014 | Cunningham | G01F 1/84 |
| | | | 700/282 |
| 2018/0089288 A1 | 3/2018 | Haggie et al. | |

FOREIGN PATENT DOCUMENTS

| | | |
|---|---|---|
| WO | 2013105933 A1 | 7/2013 |
| WO | 2014203246 A2 | 12/2014 |

* cited by examiner

NOTIFICATION OF EVENTS AND APPORTIONING OF PROCESS DATA IN A METER

TECHNICAL FIELD

The embodiments described below relate to process data in a meter and, more particularly, to providing a notifying of events and apportioning of process data in the meter.

BACKGROUND

Meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, meters comprise a sensor assembly and an electronics portion. The material within the sensor assembly may be flowing or stationary. Each type of sensor may have unique characteristics, which a meter must account for in order to achieve optimum performance. For example, some sensors may require a tube apparatus to vibrate at particular displacement levels. Other sensor assembly types may require special compensation algorithms. These requirements have analogues in other meters based on other technologies, such as magnetic flow meters, ultrasound, etc.

Regardless of the technology, meters typically include a meter electronics that can store process data. The process data may be comprised of measurements of a material that is measured by the meter, measurements of environmental conditions, values related to a condition of the meter, or the like. The process data can be stored as a historian file. This historian file can store various types of data with various write frequencies. The historian file may also store derived data, such as moving averages, standard deviations, differences between parameters, etc. Storing large amounts of data by having a relatively long time-duration and/or relatively high write frequency can be valuable to a customer. For example, the customer may wish to perform a post-event analysis of the process data and may wish to access data before and after the event.

However, storing a significant amount of data due to, for example, frequently sampling and writing a process parameter can be prohibitively expensive. The customer may also not wish to analyze all events or all process data after an event. The customer may also desire to reduce labor associated with accessing the process data or monitoring for events. Accordingly, there is a need to provide a notification of an event and apportioning of the process data in a meter.

SUMMARY

A meter electronics configured to notify of an event and apportion process data is provided. According to an embodiment, the meter electronics comprises a memory configured to continuously store the process data for a duration, a processor communicatively coupled to the memory. The processor is configured to detect one or more events in the process data and at least one of generate a notification and apportion the process data based on the detected one or more events.

A meter configured to notify of an event and apportion process data is provided. According to an embodiment, the meter comprises a meter electronics configured to continuously store the process data for a duration. The meter electronics is configured to detect one or more events in the process data, and at least one of generate a notification and apportion the process data based on the detected one or more events.

A method for notification of an event and apportioning process data is provided. According to an embodiment, the method comprises continuously storing process data for a duration, detecting one or more events in the process data, and at least one of generating a notification and apportioning the process data based on the detected one or more events.

ASPECTS

According to an aspect, a meter electronics (20) configured to notify of an event and apportion process data comprises a memory (230) configured to continuously store the process data (410) for a duration (412), a processor (210) communicatively coupled to the memory (230). The processor (210) is configured to detect one or more events (430) in the process data (410) and at least one of generate a notification (460) and apportion the process data (410) based on the detected one or more events (430).

Preferably, the processor (210) is further configured to generate the notification (460) based on an anterior context length (444).

Preferably, the processor (210) being configured to generate the notification (460) comprises the processor (210) being configured to include information related to the detected one or more events (430) in the notification (460).

Preferably, the processor (210) being configured to generate the notification (460) comprises including information related to downloading the process data (410) in the notification (460).

Preferably, the processor (210) is further configured to provide the notification (460) via at least one of a port (26) and a user interface (30).

Preferably, the processor (210) is further configured to apportion the process data (410) into an apportioned process data (450), the apportioned process data (450) including an event related process data (410a).

Preferably, the apportioned process data (450) further includes at least one of an anterior context data (410b) and a posterior context data (410c).

Preferably, the processor (210) is further configured to provide the apportioned process data (450) via at least one of a port (26) and an external storage device (236).

Preferably, the processor (210) being configured to detect the one or more events (430) comprises the processor (210) being configured to determine if a process parameter (340) exceeds a threshold.

According to an aspect, a meter (5) configured to notify of an event and apportion process data comprises a meter electronics (20) configured to continuously store the process data (410) for a duration (412). The meter electronics (20) is configured to detect one or more events (430) in the process data (410) and at least one of generate a notification (460) and apportion the process data (410) based on the detected one or more events (430).

Preferably, the meter electronics (20) is further configured to generate the notification (460) based on an anterior context length (444).

Preferably, the meter electronics (20) being configured to generate the notification (460) comprises the meter electronics (20) being configured to include information related to the detected one or more events (430) in the notification (460).

Preferably, the meter electronics (20) being configured to generate the notification (460) comprises the meter electronics (20) being configured to include information related to downloading the process data (410) in the notification (460).

Preferably, the meter electronics (20) is further configured to provide the notification (460) via at least one of a port (26) and a user interface (30).

Preferably, the meter electronics (20) is further configured to apportion the process data (410) into an apportioned process data (450), the apportioned process data (450) including an event related process data (410a).

Preferably, the apportioned process data (450) further includes at least one of an anterior context data (410b) and a posterior context data (410c).

Preferably, the meter electronics (20) is further configured to provide the apportioned process data (450) via at least one of a port (26) and an external storage device (236).

Preferably, the meter electronics (20) being configured to detect the one or more events (430) comprises the meter electronics (20) being configured to determine if a process parameter (340) exceeds a threshold.

According to an aspect, a method for notification of an event and apportioning process data comprises continuously storing process data for a duration, detecting one or more events in the process data, and at least one of generating a notification and apportioning the process data based on the detected one or more events.

Preferably, the method further comprises generating the notification based on an anterior context length.

Preferably, generating the notification comprises including information related to the detected one or more events in the notification.

Preferably, generating the notification comprises including information related to downloading the process data in the notification.

Preferably, the method further comprises providing the notification via at least one of a port and a user interface.

Preferably, the method further comprises apportioning the process data into an apportioned process data, the apportioned process data including an event related process data.

Preferably, the apportioned process data further includes at least one of an anterior context data and a posterior context data.

Preferably, the method further comprises providing the apportioned process data via at least one of a port and an external storage device.

Preferably, the method further comprises detecting the one or more events if a process parameter exceeds a threshold.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of notifying of an event and apportioning process data. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of notifying of the event and apportioning the process data. As a result, the embodiments described below are not limited to the specific examples described below, but only by the claims and their equivalents.

Figure 1:
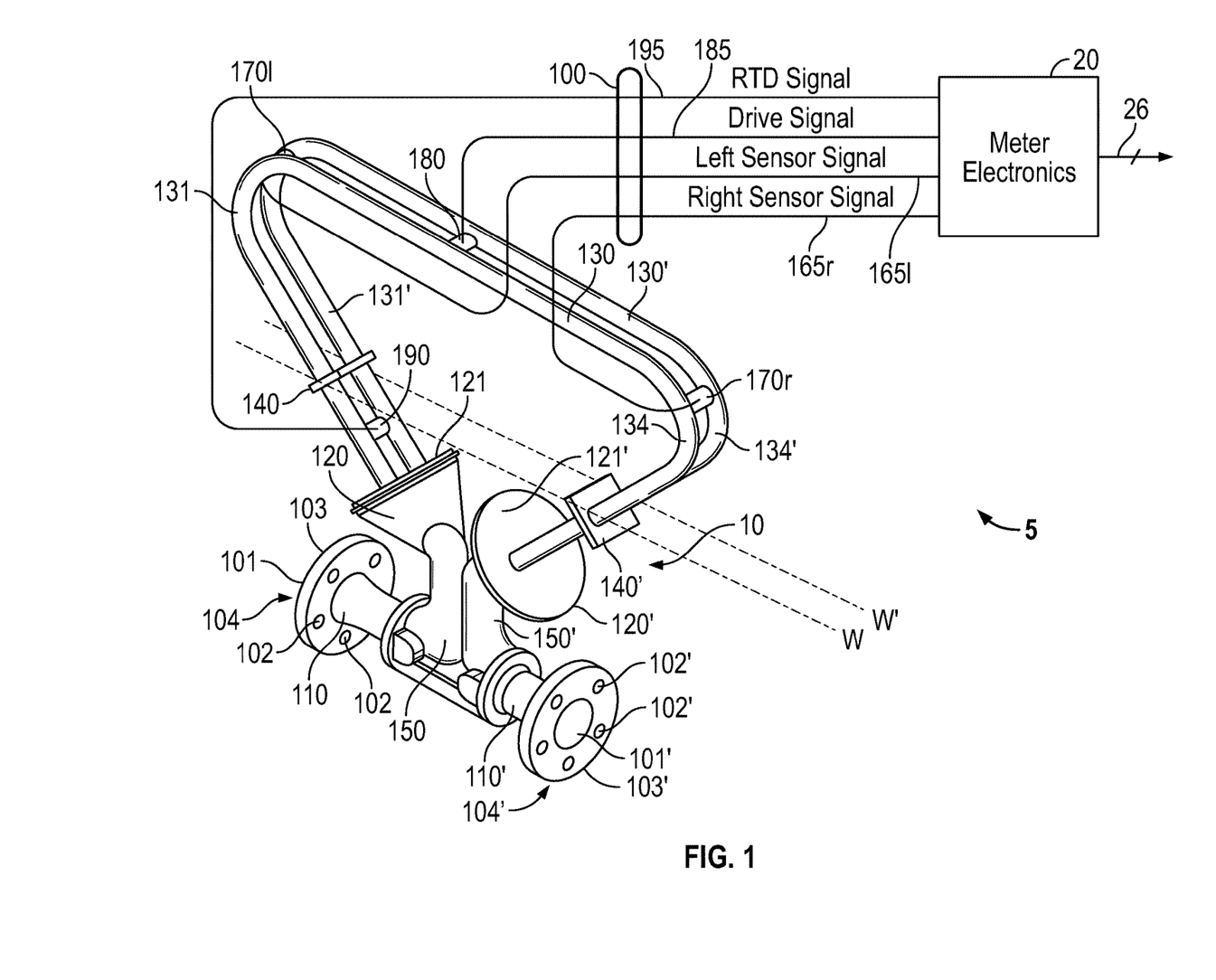
FIG. 1 shows a meter 5 that notifies of events and apportions process data.

FIG. 1 shows a meter 5 that notifies of events and apportions process data. As shown in FIG. 1, the meter 5 is a vibratory meter comprising a sensor assembly 10 and meter electronics 20, although any suitable meter may be employed. The sensor assembly 10 responds to mass flow rate and density of a process material. The meter electronics 20 is connected to the sensor assembly 10 via leads 100 to provide density, mass flow rate, and temperature information over path 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and the left and right sensor signals appearing on leads 100 carrying the left and right sensor signals 165l, 165r, respectively. The meter electronics 20 produces the drive signal 185 appearing on the lead to driver 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over port 26 as a signal.

Figure 2:
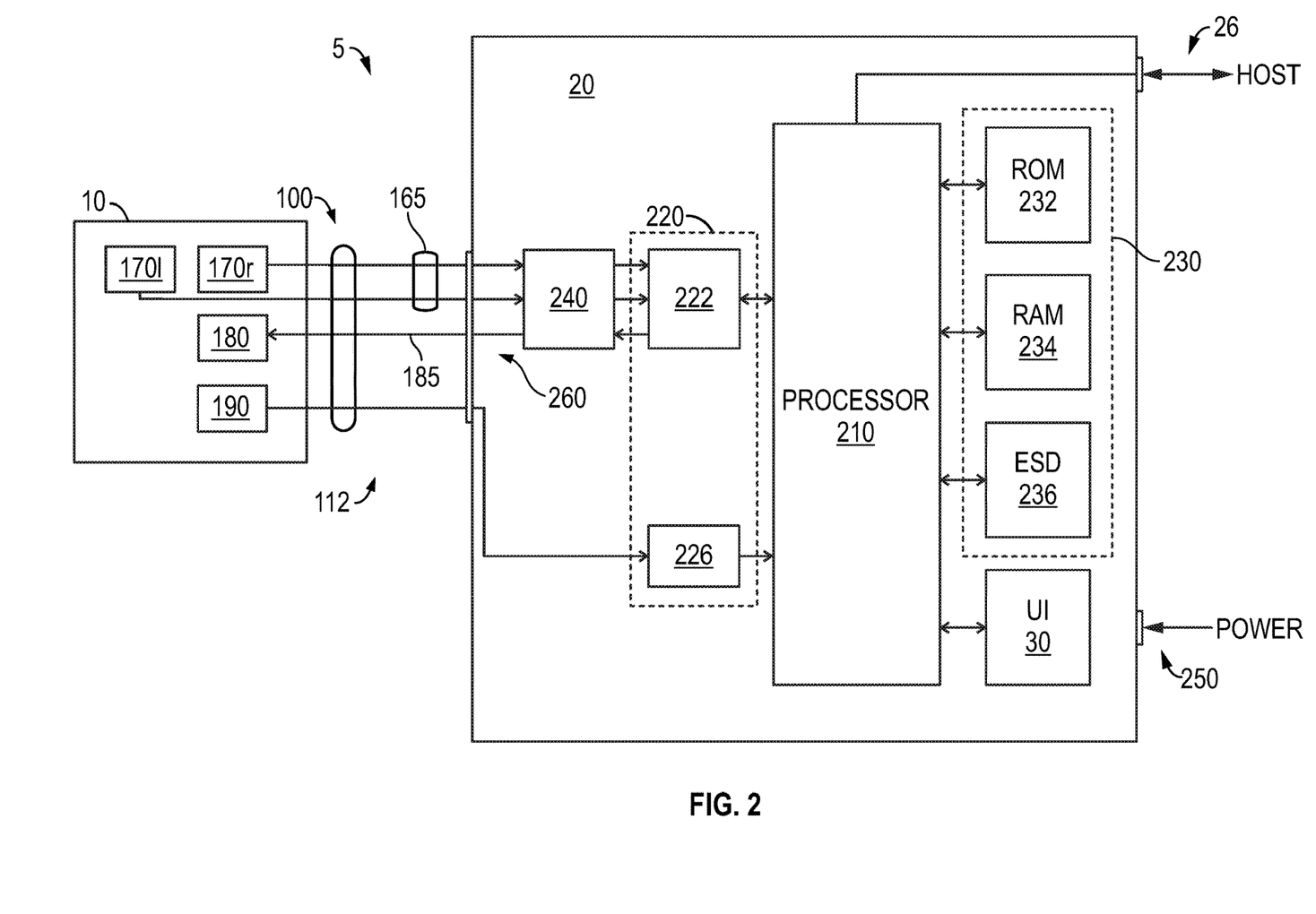
FIG. 2 shows a block diagram of the meter 5, including a block diagram representation of the meter electronics 20.

FIG. 2 shows a block diagram of the meter 5, including a block diagram representation of the meter electronics 20. As shown in FIG. 2, the meter electronics 20 is communicatively coupled to the sensor assembly 10. As described in the foregoing with reference to FIG. 1, the sensor assembly 10 includes the left and right pick-off sensors 170l, 170r, driver 180, and RTD 190, which are communicatively coupled to the meter electronics 20 via the set of leads 100 through a communications channel 112 and an I/O port 260.

The meter electronics 20 provides a drive signal 185 via the leads 100. More specifically, the meter electronics 20 provides a drive signal 185 to the driver 180 in the sensor assembly 10. In addition, sensor signals 165 are provided by the sensor assembly 10. More specifically, in the embodiment shown, the sensor signals 165 are provided by the left and right pick-off sensor 170l, 170r in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the path 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 is also configured to provide information, such as a phase difference, a property of a fluid in the sensor assembly 10, or the like. The processor 210 may provide the information to the host through the communication port. The processor 210 may also be configured to communicate with the one or more memories 230 to receive and/or store information in the one or more memories 230. For example, the processor 210 may receive calibration factors and/or sensor assembly zeros (e.g., phase difference when there is zero flow) from the one or more memories 230. Each of the calibration factors and/or sensor assembly zeros may respectively be associated with the flow meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170l, 170r. The CODEC 222 is also configured to provide the drive signal 185 to the driver 180. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full scale range of the CODEC 222.

In the embodiment shown, the one or more memories 230 is comprised of a read-only memory (ROM) 232, random access memory (RAM) 234, and an external storage device (ESD) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the external storage device 236. As shown, the external storage device 236 may be a flash memory card, USB stick, or the like, that may be removed by a user. The one or more memories 230 may be a storage configured to store data, such as calibration values, meter verification values, or the like. These values can be used to calculate a mass flow rate.

A mass flow rate measurement (ṁ) can be generated according to the equation:

$$\dot{m} = FCF[\Delta t - \Delta t_0] \quad [1]$$

The $\Delta t$ term comprises an operationally-derived (i.e., measured) time delay value comprising the time delay existing between the pickoff sensor signals, such as where the time delay is due to Coriolis effects related to mass flow rate through the vibratory flowmeter 5. The measured $\Delta t$ term ultimately determines the mass flow rate of the flow material as it flows through the vibratory flowmeter 5. The $\Delta t_0$ term comprises a time delay/phase difference at zero flow calibration constant. The $\Delta t_0$ term is typically determined at the factory and programmed into the vibratory flowmeter 5. The time delay/phase difference at zero flow $\Delta t_0$ term will not change, even where flow conditions are changing. The flow calibration factor FCF is proportional to a physical stiffness of the flow meter. The calibration and meter verification terms, the mass flow rates, and other process parameters may have corresponding values that can be stored and processed in the meter electronics 20.

Figure 3:
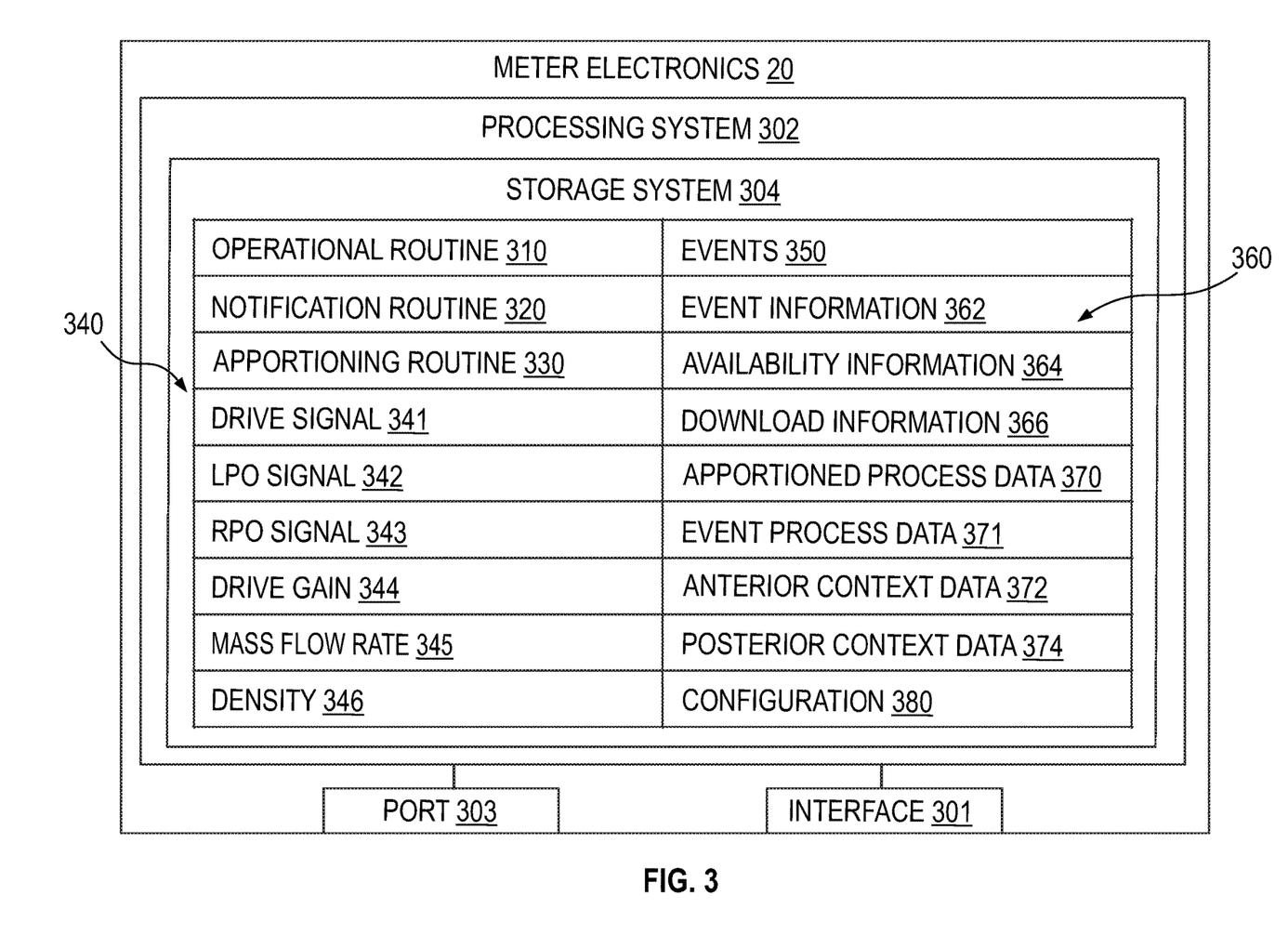
FIG. 3 shows the meter electronics 20 for notifying of events and apportioning process data in a meter.

FIG. 3 shows the meter electronics 20 for notifying of events and apportioning process data in a meter. The meter electronics 20 can include an interface 301 and a processing system 302. The meter electronics 20 receives a vibrational response, such as from the sensor assembly 10, for example. The meter electronics 20 processes the vibrational response in order to obtain flow characteristics of the flow material flowing through the sensor assembly 10. As shown in FIG. 3, the meter electronics 20 includes a processing system 302 that is communicatively coupled to a storage system 304. The processing system 302 is also communicatively coupled to an interface 301 and a port 303.

The interface 301 receives the vibrational response from each of the pick-off sensors 170l, 170r via the leads 100 of FIG. 1. The interface 301 can perform any necessary or desired signal conditioning, such as any manner of formatting, amplification, buffering, etc. Alternatively, some or all of the signal conditioning can be performed in the processing system 302. In addition, the interface 301 can enable communications between the meter electronics 20 and external devices. The interface 301 can be capable of any manner of electronic, optical, or wireless communication. The interface 301 can provide information based on the vibrational response. The interface 301 in one embodiment is coupled with a digitizer (not shown), wherein the sensor signal comprises an analog sensor signal. The digitizer may sample and digitize an analog vibrational response and produce the digital vibrational response.

The port 303 may be an input/output port, such as the port 26 described in the foregoing with reference to FIGS. 1 and 2, although any suitable port may be employed. The port 303 may communicate with, for example, a user's terminal or server to provide, receive, and/or exchange data. For example, process data may be provided by the processing system 302 to the user's terminal or server. The user's terminal or server may also send commands or requests to the processing system 302 via the port 303. The port 303 may be of any suitable type and conform to any suitable protocol, such as a RS-232, universal serial bus (USB), or the like. The port 303 may also be configured to be connected to networks, such as a master-slave network, where the user's computer or server acts as a master, although any suitable network configuration may be employed.

The processing system 302 conducts operations of the meter electronics 20 and processes flow measurements from the sensor assembly 10. The processing system 302 executes one or more processing routines and thereby processes the flow measurements in order to produce one or more flow characteristics. The processing system 302 is communicatively coupled to and is configured to receive the information from the interface 301.

The processing system 302 can comprise a general-purpose computer, a micro-processing system, a logic circuit, or some other general purpose or customized processing device. Additionally, or alternatively, the processing system 302 can be distributed among multiple processing devices. The processing system 302 can also include any manner of integral or independent electronic storage medium, such as the storage system 304. The processing system 302 may be comprised of the processor 210 and the one or more memories 230 described with reference to FIG. 2, although any suitable processing system may be employed.

The storage system 304 can store flow meter parameters and data, software routines, constant values, and variable values. In one embodiment, the storage system 304 includes routines that are executed by the processing system 302, such as an operational routine 310, a notification routine 320, and/or an apportioning routine 330 of the meter 5. The storage system 304 can also store statistical values, such as, a standard deviation, confidence intervals or the like. The storage system 304 may be comprised of the one or more memories 230 described with reference to FIG. 2.

As shown in FIG. 3, the storage system 304 includes the operational routine 310, notification routine 320, and apportioning routine 330. The operational routine 310 performs steps to measure and determine values of process parameters. For example, the operational routine 310 may receive the sensor signals from the sensor assembly 10 and determine a density, mass flow rate, viscosity, etc. of material in the sensor assembly. The operational routine 310 may also determine other values of the process parameters that are not properties of the material, such as a drive gain, drive signal parameter (e.g., amplitude, frequency, phase), etc. Other process parameters may be derived from the measured properties of the material and/or the other process parameters, such as void fractions, totalized mass flow, material compositions, or the like. These and other values may be continuously sampled and written to the storage system 304 as process parameters 340.

As shown in FIG. 3, the process parameters 340 include a drive signal 341, a left pickoff signal 342, and a right pickoff signal 343, which may respectively be measured values of an amplitude, frequency, and/or phase of the drive signal 341, the left pickoff signal 342, and the right pickoff signal 343. The drive signal 341, the left pickoff signal 342, and the right pickoff signal 343 may have one or more frequency components and any suitable shape, such as sinusoidal, square, triangle, etc. The drive signal 341, left pickoff signal 342, and right pickoff signal 343 may be used to determine the drive gain 344. The drive signal 341, the left pickoff signal 342, the right pickoff signal 343, and the drive gain 344 may be provided and/or measured by the operational routine 310.

The process parameters 340 also includes measured properties of the material that are derived from the drive signal 341, the left pickoff signal 342, the right pickoff signal 343, and/or the drive gain 344. As shown in FIG. 3, the process parameters 340 includes a mass flow rate 345 and a density 346. The mass flow rate 345 can be determined by the operational routine 310 by determining a time delay or phase difference between the left pickoff signal 342 and the right pickoff signal 343. The operational routine 310 may also determine a density 346 from a frequency of the drive signal 341. However, any suitable method may be used to determine values of the mass flow rate 345 and density 346.

These and/or other process parameters may indicate that an event has occurred. For example, a relatively high value of the drive gain 344 may indicate a void in the material. Accordingly, a threshold value may be used to determine that the void is present in the material. That is, if the values of the drive gain 344 are greater than a corresponding drive gain threshold, then the operational routine 310 may determine that the void is present in the material. The operational routine 310 may store the values of the process parameters 340 as event related process data corresponding to each of the process parameters 340. The operational routine 310 may also store the presence of the void in the storage system 304 as an event, as will be described in more detail in the following.

As shown in FIG. 3, the storage system 304 includes events 350. The events 350 may be comprised of any suitable event indicator, such as a label, code, description, etc., of the event and, in some embodiments, information on related process parameters 340. For example, the events 350 may include a label of "void" with timestamps and related process parameter labels indicating which values of the related process parameters 340 indicated the void. By way of example, a label of "void" in the events 350 may be associated with the values of the drive gain 344 that exceeded the corresponding drive gain threshold. This association may be, for example, time stamps that indicate which values of the drive gain 344 exceeded the corresponding drive gain threshold. However, any suitable format and/or information may be in the events 350.

The process parameters 340 may be comprised of historian files in the storage system 304 which contain the process data having values periodically written to the historian files at a fixed interval and stored for a time-duration. That is, the process data may be continuously stored in the storage system 304 as the measurements are made. The process data of the process parameters 340 may be historian data, such as a time-stamped list of values, a table with a value column and a time-stamp column, sequential list of the values with date/time related information, or the like. In this example, the most recent value may be a first value in the process data and the most precedent value may be a last value in the process data, although any suitable structure may be employed. Although the process data of the process parameters 340 may be described as being historian data with, for example, fixed sampling/write intervals stored over a fixed time-duration, the sampling/write intervals and/or duration may be dynamic and based on something other than time, such as a size of the file, database, list, or record, or the like.

The drive gain 344 may have a short duration but consume a large portion of the storage system 304. More specifically, a size of the process data of the drive gain 344 may be relatively large and may also have a relatively short time-duration. For example, the values of the drive gain 344 may be considered "fast data" that is written every 1 to 10 seconds. The time-duration for the fast data, such as the drive gain 344, may be short due to a data density required to store information at the relative short sampling/write interval. By way of example, the time-duration for the drive gain 344 may be a week, although any suitable time-duration may be employed.

Other process parameters 340, such as an average of the mass flow rate 345, may have a large duration. More specifically, for this example, process data comprising averages of the mass flow rate 345 may have a relatively long time-duration. By way of illustration, the average of the mass flow rate 345 may be considered "slow data" that is written every five minutes. The time-duration for the slow data may be long due to a lack of data density from infrequent writing (e.g., long sampling/write intervals) of the average of the mass flow rate 345. The time-duration of the averages of the mass flow rate 345 may be 30 days, although any suitable time-duration may be employed. The time-duration of the slow data is typically larger than the time-duration of the fast data even though they may be equal in size.

Data that is not within the duration of the process data is not retained in the storage system 304 and may therefore not be available for analysis. As a result, the user could not obtain, for example, values of the drive gain 344 associated with a void event if the void event occurred outside the time-duration of the drive gain 344. With more specificity, in this example, the user will not be able to download values of the drive gain 344 written at times that are older than the time-duration of the drive gain 344.

The processing system 302 may execute the notification routine 320 to generate a notification 360 based on one or more events, such as an event in the events 350. The notification 360 may include information related to the events 350, such as an event information 362 shown in FIG. 3. For example, if the values of the drive gain 344 exceeds the corresponding drive gain threshold, then the processing system 302 may generate the notification 360 including the event information 362 indicating that a void was in the material. The notification 360 may not include the values of the drive gain 344 that exceeded the corresponding drive gain threshold. The notification 360 may be generated contemporaneous with the event of the events 350.

Due to the notification 360 being generated contemporaneous with the event, the user may be able to download the process data of the drive gain 344 within the time-duration of the drive gain 344. For example, on receipt of the notification, the user may immediately download the process data of the drive gain 344 onto the external storage device 236 and remove the external storage device 236 for offline analysis. However, the user may not be able to immediately download the data and may therefore need to set aside time in the future to download the process data and may therefore need information on the time-duration of the process data related to the event.

Accordingly, the processing system 302 may also execute the notification routine 320 to generate the notification 360 based on the time-durations of the process data of the process parameters 340. For example, as shown in FIG. 3, the notification 360 may include availability information 364 that indicates when the process data associated with the event may be available for download. The availability information 364 may be a date and time, a time-duration (e.g., 7 days), or the like. Accordingly, the user may know when the process data associated with the event may no longer be available and, therefore schedule a downloading of the process data. However, the user may not know what process data is associated with the event and how the associated process data may be downloaded.

Accordingly, the processing system 302 may also generate the notification 360 based on the process data that may be downloaded. For example, the notification 360 may include in the notification 360 download information 366 indicating how the process data may be accessed, the process data that is associated with the event, or the like. For example, the event information 362 may indicate that the void was present in the material but may not indicate which process parameter 340 indicated the void was present. Accordingly, the download information 366 may also inform the user that the process data of the drive gain 344 is associated with the event, such as the void in the material. The download information 366 may also indicate that the process data is available via the port 303 and/or the external storage device 236.

The user may therefore use the notification 360 to download the process data associated with the event. For example, the notification 360 may include the event information 362 indicating that the event is the void in the material, the availability information 364 showing that the process data is available, for example, for a week, and the download information 366 stating that the process data of the drive gain 344 is associated with the event and may be downloaded via the port 303. However, the port 303, as well as the external storage device 236, may have limited bandwidth and/or memory.

The processing system 302 may accordingly execute the apportioning routine 330 to apportion the process data of the process parameters 340. For example, the processing system 302 may execute an apportioning routine 330 that reduces a size of the process data that is available for downloading by the user. The process data of the process parameters 340 may be apportioned by selecting a portion of the process data that is associated with the event and saving the selected data as apportioned process data 370. The apportioned process data 370 may also include context data for the process data associated with the event. As shown in FIG. 3, the apportioned process data 370 includes an anterior context data 372 and a posterior context data 374, which are described in more detail in the following with reference to FIG. 4.

Still referring to FIG. 3, various attributes of, or related to, the notification 360 and/or apportioned process data 370 may be configured in a configuration 380. For example, a user may configure the meter electronics 20 to only notify the user of some events. The meter electronics 20 may be also configured to repeat the notification for a notification period. With more specificity, the meter electronics 20 may be configured to generate and provide the notification 360, 460 every hour for 12 hours, although other rates and/or periods may be employed.

Additionally, or alternatively, the meter electronics 20 may be configured by the configuration 380 to store the apportioned process data 370 for an apportioned data time-duration that is longer than the time-duration of the process data of the process parameters 340. For example, the configuration 380 may configure the meter electronics 20 to store the apportioned process data 370 for two weeks where the time-duration of the process data of the process parameters 340 is a week. In another example, the configuration 380 may include association configurations that configure the meter electronics 20 to associate some of the process parameters 340 with some of the events 350. For example, the configuration 380 may indicate that for a given event of the events 350, such as a void, the apportioned process data 370 should include a drive gain 344 and a mass flow rate 345.

The configuration 380 may be read, operated on, and/or written to by the operational routine 310, the notification routine 320, and/or apportioning routine 330. For example, the operational routine 310 may update the configuration 380 with an additional process parameter that the user manually chose when downloading other process data associated with an event. In another example, the notification routine 320 may update the configuration 380 with a reduced notification period due to the user terminating the notification during the notification period. The apportioning routine 330 may add or remove an association configuration between process parameters 340 and the events 350 when the user removes an association during a download. For example, a user may read the apportioned process data 370 for a given event and choose to delete process data of a process parameter 340 in the apportioned process data 370 prior to downloading the apportioned process data. The apportioning routine 330 may delete the corresponding association configuration in the configuration 380. These and other operations may be performed on the configuration 380 to ensure that the apportioned process data 370 efficiently utilizes the port 303 and/or ESD 236. An exemplary apportioned process data is described in more detail in the following with reference to FIG. 4.

Exemplary Apportioned Process Data

Figure 4:
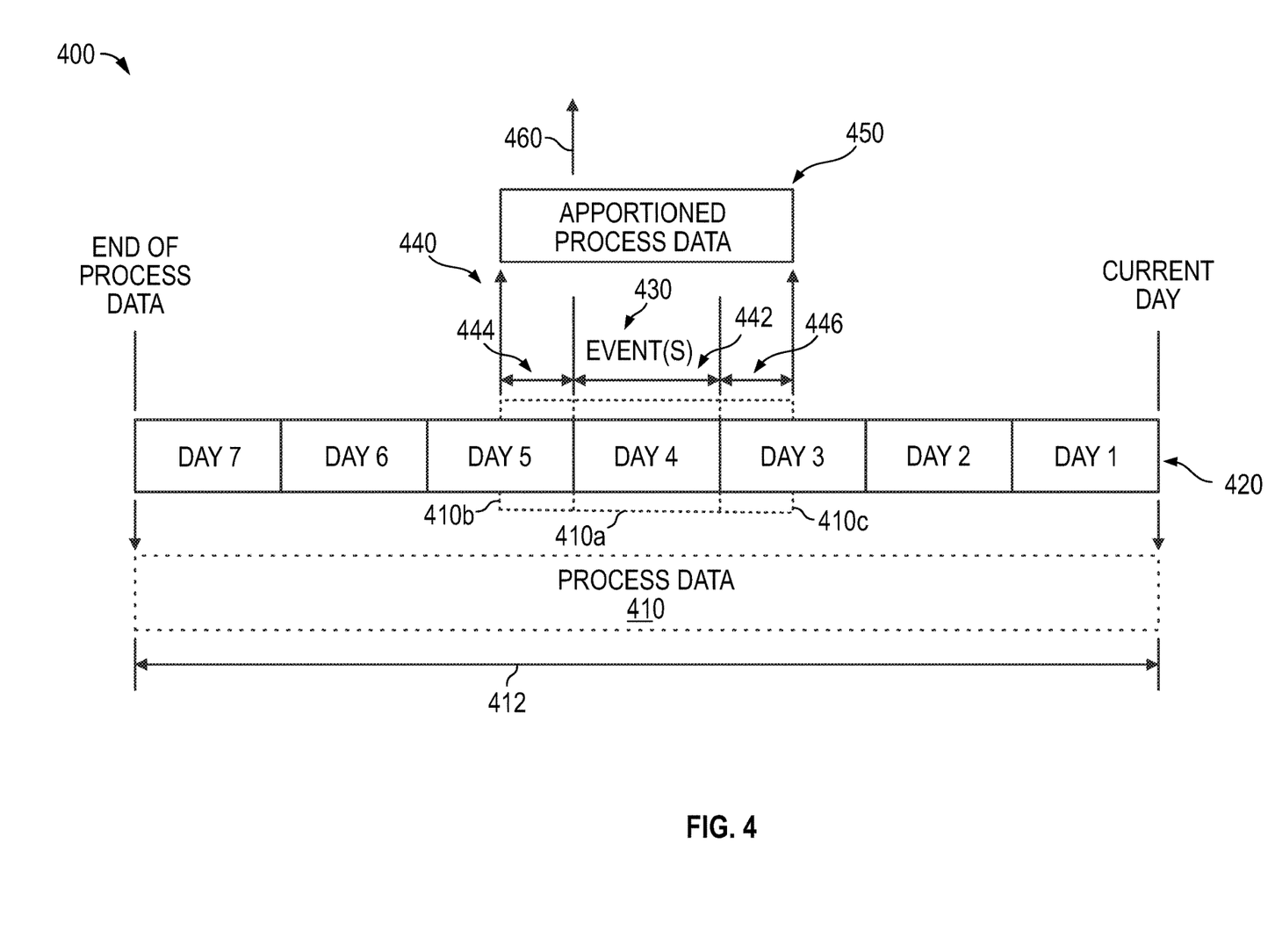
FIG. 4 shows an apportioning 400 of process data 410.

FIG. 4 shows an apportioning 400 of process data 410. As shown in FIG. 4, the process data 410 is in a process parameter file 420 that is divided by days. The process parameter file 420 may be associated with, for example, the drive gain 344 described above, although any suitable process parameter may be employed. The process data 410 is shown as having a duration 412, which corresponds to a time-duration of seven days shown in the process parameter file 420. A first data in the process parameter file 420 may be a most recent data that corresponds to a current day shown in FIG. 4, and a last data in the process parameter file 420 may be a most precedent data that corresponds to an end of the seven day duration. Event related process data 410a of the process parameter file 420 is also shown. Anterior context data 410b and posterior context data 410c are also part of the process parameter file 420 and respectively precede and succeed the event related process data 410a.

As shown, the event related process data 410a may be associated with events 430. The events 430 has an event length 442, the anterior context data 410b has an anterior context length 444, and the posterior context data has a posterior context length 446. A sum of the event length 442, the anterior context length 444, and the posterior context length 446 is a span 440. The span 440 may be a span of an apportioned process data 450. Accordingly, the event related process data 410a are part of an apportioned process data 450. Although not necessarily part of an apportioning, FIG. 4 shows a notification 460 being generated contemporaneously with a start or an anterior of the events 430, although a notification may be generated at alternative times, such as contemporaneous to an end or posterior of the events 430.

As discussed above with reference to the process parameters 340 shown in FIG. 3, the process data 410 may be any suitable data in any suitable format. For example, the process data 410 may be a list of process parameter values associated with a header having a time-stamp of the first data and a write period of, for example, 5 seconds indicating that the process parameter values were written every 5 seconds. Other formats may be used, such as a table including a time-stamp column and corresponding process parameter values of the process parameter file 420. In these and other process data, a time-duration in, for example, seconds may be determined from the process data, however, the duration 412 may be in any suitable form, units (e.g., hh:mm:ss), non-units (e.g., number of rows in a table), etc.

The process parameter file 420 may be a file that is associated with a process parameter indicative of an event, such as a drive gain value that exceeds a drive gain threshold. Alternative process parameter files may be used that are not indicative of the event but may nevertheless be associated with the event. For example, the drive gain exceeding the drive gain threshold may be indicative of a void in a material, but the density 346 may also be associated with the void. That is, it may be useful to also analyze both the process data of both the drive gain 344 and the density 346 even though only the drive gain 344 indicated the void. As can be appreciated, more than one process data may be downloaded, such as the process data of the drive gain 344 and the density 346 described with reference to FIG. 3.

The events 430 may be anything indicative of a process condition in the meter 5. The events 430 may be flags, errors, diagnostics, etc., that are related to the process conditions in the meter 5. The process conditions in the meter 5 may be, for example, conditions of the material (e.g., slugs, voids, mixed-phase flow, etc.), process parameters (e.g., temperature, pressure, flow rates, density) that exceed a threshold, or the like. As shown in FIG. 4, the events 430 occur during day 4 and are continuous, although events may occur at other times and may be discontinuous. For example, additional events may occur during day 2 in alternative embodiments. Accordingly, the apportioned process data 450 may include process data from day 2 and day 4, but not all of day 3.

The span 440 may be quantified in any suitable form and may or may not have units. As shown in FIG. 4, the span 440 has a length of approximately two days extending from about the middle of day 5 to about the middle of day 3. As shown, an available time for downloading the apportioned process data 450 is about 2.5 days. This is due to process data 410 being written after the events 430 began. That is, some time has passed since the events 430 occurred and the notification 460 was sent. When the events 430 began, the available time was 7 days if only the event related process data 410a was apportioned. Availability information, such as the availability information 364 discussed above, may include these and other information.

As shown in FIG. 4, the apportioned process data 450 may be generated based on the process data 410. For example, the apportioned process data 450 may be generated by using the configuration 380 discussed above that configures associations between the events 430 and the event related process data 410a. Accordingly, the apportioned process data 450 includes the event related process data 410a. For example, if the events 430 are voids detected in the material, then the event related process data 410a may include drive gain values that exceed a threshold value. However, the apportioned process data 450 may also include process data that did not indicate the events 430. For example, the apportioned process data 450 may additionally include density values that are contemporaneous to the events 430 but did not indicate the events 430. Accordingly, the user may analyze the process data of the drive gain and the density measurements.

The notification 460 may be generated based on both the duration 412 and/or the anterior context length 444. As shown, the notification 460 may also include availability information indicating that the apportioned process data 450 may be downloaded 6.5 days from a date-time, such as the date-time the notification 460 was generated. The notification 460 may not indicate that the available time is 7 days because the apportioned process data 450 includes the anterior context data 410b. Alternatively, the notification 460 may indicate that the apportioned process data 450 includes the anterior context data 410b and that the anterior context data 410b has the anterior context length 444 of about 0.5 days, although any suitable availability information may be included.

The notification 460 may also be generated based on the events 430. For example, the notification 460 may include information related to the events 430, such as the void event discussed above. For example, the notification 460 may include a field having an event code, or the like, that is associated with the void event. Additionally, or alternatively, the notification 460 may also simply state that a void was detected in the material. The information related to the events 430 may also include how the events 430 were indicated. For example, the information related to the events 430 may explain that the drive gain exceeded the threshold.

The notification 460 may also be generated to include information related to downloading the process data 410. For example, the notification 460 may include information on the apportioned process data 450 (e.g., the associated process parameters), how to download the apportioned process data 450, the size of the apportioned process data 450, or the like. The notification 460 may be in any suitable format, such as a machine readable, simple text, series of codes, or the like. Accordingly, the user may be able to read the notification 460 and/or automate a download of the apportioned process data 450 via, for example, the ports 26, 303.

As discussed above, the notification routine 320 and/or apportioning routine 330 may generate a notification and apportion process data. An exemplary method for generating the notification and the apportioned process data, such as the notification 360 and the apportioned process data 370 described above, is discussed in the following with reference to FIG. 5.

Method for Notifying of an Event and Apportioning Process Data

Figure 5:
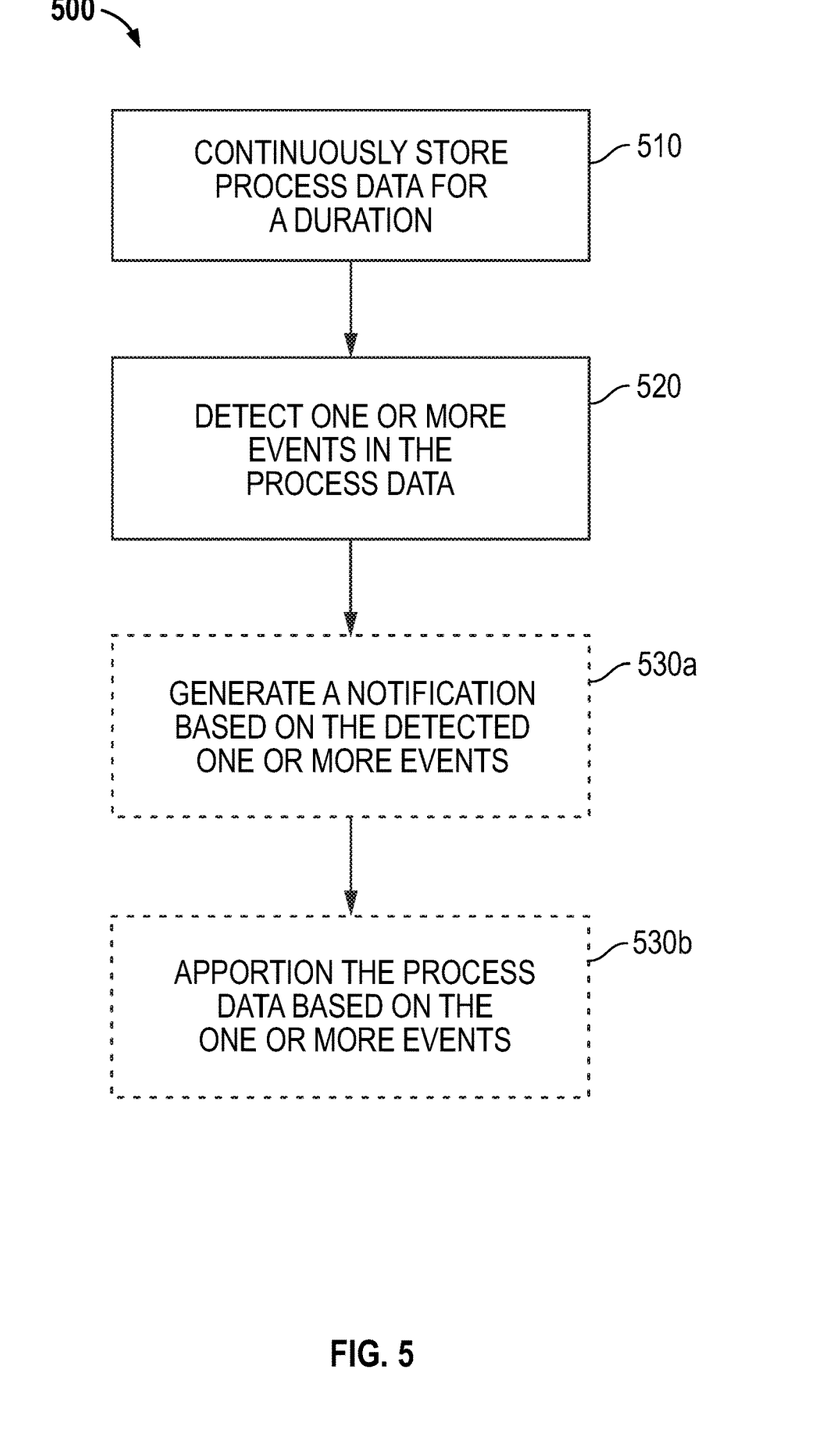
FIG. 5 shows a method 500 for notifying of an event and apportioning process data.

FIG. 5 shows a method 500 for notifying of an event and apportioning process data. As shown in FIG. 5, the method 500 begins by continuously storing process data for a duration in step 510. In step 520, the method 500 detects one or more events in the process data. The one or more events may be the events described above, or other events. The one or more events may be detected if a value or values of a process parameter exceeds a threshold. The method 500 also includes at least one of step 530a and step 530b. That is, the method 500 may perform step 530a and/or step 530b. In step 530a, the method 500 generates a notification based on the detected one or more events. In step 530b, the method 500 apportions the process data based on the one or more events. In the steps 530a, 530b the method 500 may also generate the notification based on the duration.

The method 500 may comprise additional steps, such as, for example, steps related to the notification. For example, the method 500 may generate the notification based on an anterior context length, as described above. The method 500 may also generate the notification to include information related to the detected one or more events. The notification may also be generated to include information related to downloading the process data. The method 500 may also provide the notification via a port and/or a user interface.

Additionally, or alternatively, the method 500 may include steps related to apportioning the process data. For example, the method 500 may apportion the process data into an apportioned process data, where the apportioned process data includes an event related process data. The apportioned process data may also include at an anterior context data and/or a posterior context data. The apportioned process data may be provided via a port and/or an external storage device.

The above describes a meter 5, a meter electronics 20, and a method 500 for notifying of an event and apportioning process data. Because the meter 5, meter electronics 20, and method 500 notify of the event, a user may be aware of the event in real-time and determine if process data should be downloaded. The user may therefore more efficiently prioritize interactions with the meter 5 and/or meter electronics 20. For example, the user may not wish to analyze process data related to some events and, for other events, may wish to analyze process data.

Also, because the data is apportioned, memory in the meter 5 or meter electronics 20 may be more efficiently utilized. For example, process data 410 of process parameters 340 that is related to the events may be apportioned into the apportioned process data 450 and stored in the meter electronics 20 as the apportioned process data 370. The apportioned process data 370, 450 may be provided via the port 26, 303 and/or the ESD 236. As a result, all of the process data 410 may not be downloaded by the user for a given event. This more efficiently uses the port 26, 303, and any network communicatively coupled to the port 26, 303, as well as the ESD 236.

Accordingly, a transaction time between an event and a user, server, system, or the like communicatively coupled to the port 26, 303 downloading the apportioned process data 450 may be reduced. The transaction time may be reduced by allowing a user to, for example, automate the download based on the received notification 460 and/or due to the apportioned process data 450 having a size that is less than the size of the process data 410.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other notification of events and apportioning of process data and not just to the embodiments described above and shown in the accompanying figures. Accordingly, the scope of the embodiments described above should be determined from the following claims.

We claim:

1. A meter electronics (20) configured to notify of an event and apportion process data, the meter electronics (20) comprising:
   a memory (230) configured to continuously store the process data (410) for a duration (412);
   a processor (210) communicatively coupled to the memory (230), the processor (210) being configured to:
   detect one or more events (430) in the process data (410); and
   apportion the process data (410) based on the detected one or more events (430) into an apportioned process data (450);
   wherein the apportioned process data (450) comprises an event related process data (410a) and a context data for the event related process data (410a).

2. The meter electronics (20) of claim 1, wherein the processor (210) is further configured to generate the notification (460) based on an anterior context length (444).

3. The meter electronics (20) of claim 1, wherein the processor (210) being configured to generate the notification (460) comprises the processor (210) being configured to include information related to the detected one or more events (430) in the notification (460).

4. The meter electronics (20) of claim 1, wherein the processor (210) being configured to generate the notification (460) comprises including information related to downloading the process data (410) in the notification (460).

5. The meter electronics (20) of claim 1, wherein the processor (210) is further configured to provide the notification (460) via at least one of a port (26) and a user interface (30).

6. The meter electronics (20) of claim 1, wherein the apportioned process data (450) further includes at least one of an anterior context data (410b) and a posterior context data (410c).

7. The meter electronics (20) of claim 1, wherein the processor (210) is further configured to provide the apportioned process data (450) via at least one of a port (26) and an external storage device (236).

8. The meter electronics (20) of claim 1, wherein the processor (210) being configured to detect the one or more events (430) comprises the processor (210) being configured to determine if a process parameter (340) exceeds a threshold.

9. A meter (5) configured to notify of an event and apportion process data, the meter (5) comprising:
   a meter electronics (20) configured to continuously store the process data (410) for a duration (412), the meter electronics (20) being configured to:
   detect one or more events (430) in the process data (410); and
   apportion the process data (410) based on the detected one or more events (430) into an apportioned process data (450);
   wherein the apportioned process data (450) comprises an event related process data (410a) and a context data for the event related process data (410a).

10. The meter (5) of claim 9, wherein the meter electronics (20) is further configured to generate the notification (460) based on an anterior context length (444).

11. The meter (5) of claim 9, wherein the meter electronics (20) being configured to generate the notification (460) comprises the meter electronics (20) being configured to include information related to the detected one or more events (430) in the notification (460).

12. The meter (5) of claim 9, wherein the meter electronics (20) being configured to generate the notification (460) comprises the meter electronics (20) being configured to include information related to downloading the process data (410) in the notification (460).

13. The meter (5) of claim 9, wherein the meter electronics (20) is further configured to provide the notification (460) via at least one of a port (26) and a user interface (30).

14. The meter (5) of claim 9, wherein the apportioned process data (450) further includes at least one of an anterior context data (410b) and a posterior context data (410c).

15. The meter (5) of claim 9, wherein the meter electronics (20) is further configured to provide the apportioned process data (450) via at least one of a port (26) and an external storage device (236).

16. The meter (5) of claim 9, wherein the meter electronics (20) being configured to detect the one or more events (430) comprises the meter electronics (20) being configured to determine if a process parameter (340) exceeds a threshold.

17. A method for notification of an event and apportioning process data, the method comprising:
   continuously storing process data for a duration;
   detecting one or more events in the process data; and
   apportioning the process data based on the detected one or more events into an apportioned process data;
   wherein the apportioned process data comprises an event related process data and a context data for the event related process data.

18. The method of claim 17, further comprising generating the notification based on an anterior context length.

19. The method of claim 17, wherein generating the notification comprises including information related to the detected one or more events in the notification.

20. The method of claim 17, wherein generating the notification comprises including information related to downloading the process data in the notification.

21. The method of claim 17, further comprising providing the notification via at least one of a port and a user interface.

22. The method of claim 17, wherein the apportioned process data further includes at least one of an anterior context data and a posterior context data.

23. The method of claim 17, further comprising providing the apportioned process data via at least one of a port and an external storage device.

24. The method of claim 17, further comprising detecting the one or more events if a process parameter exceeds a threshold.

* * * * *